Nov. 15, 1955  H. L. JOHNSON  2,723,597
DIE SINKER

Filed June 11, 1954  3 Sheets-Sheet 1

INVENTOR:
HARRY L. JOHNSON
BY George Sipkin
Lee I. Huntzberger
ATTORNEYS:

Nov. 15, 1955

H. L. JOHNSON
DIE SINKER 2,723,597

Filed June 11, 1954

INVENTOR:
HARRY L. JOHNSON
BY George Sipkin
Lee S. Huntzberger
ATTORNEYS:

Nov. 15, 1955  H. L. JOHNSON  2,723,597
DIE SINKER
Filed June 11, 1954  3 Sheets-Sheet 3

INVENTOR:
HARRY L. JOHNSON
BY George Sipkin
Lee J. Huntzberger
ATTORNEYS:

United States Patent Office 2,723,597
Patented Nov. 15, 1955

2,723,597

DIE SINKER

Harry L. Johnson, Gloucester, Mass.

Application June 11, 1954, Serial No. 436,264

7 Claims. (Cl. 90—11.4)

(Granted under Title 35, U. S. Code (1952), sec. 266)

The invention described herein may be manufactured and used by or for the Government of the United States of America for governmental purposes without the payment of any royalties thereon or therefor.

The present invention concerns a die-sinking machine and in particular concerns an attachment for a die-sinking machine whereby a complete spiral can be cut in a workpiece.

In cutting workpieces such as a Carpenter stopper or a mold or a shaper for a rope walk, which workpieces are to be used in the manufacture of rope or cable that is twisted in a spiral pattern, it is necessary to cut the workpiece with a spiral cut corresponding to the twist of the rope or cable.

In past practice it has been found that to make such workpieces by casting provides inaccuracies and irregular grooves that cause damage to rope or cable nested in the workpiece. It has been determined by extensive tests that great accuracy is needed for the spiral grooves in this type of workpiece to guarantee freedom from cutting of the rope and also freedom from slippage. Accordingly, it has become necessary in the sake of accuracy to machine all such workpieces from solid bar steel.

The cutting of spiral grooves in such a workpiece involves two motions, namely those of length and breadth, and both of these motions vary as cutting progresses. In the past it has been the practice to make cutter settings by hand feed, first length and then breadth or vice versa, which has the disadvantage of being subject to human error in either one or both of the hand feed settings. A further disadvantage is involved in the fact that cutting necessarily proceeds at an extremely slow rate in order than a single operator be able to hand feed both settings.

The present invention overcomes these difficulties by providing an attachment for a die-sinking machine that moves the length feed and the breadth feed simultaneously. The attachment provides a single lever for simultaneously moving length feed and breadth feed with the lever being connected to ratchet-tooth disks secured to the length and breadth hand wheels and so timed that a complete spiral can be cut by a simple up and down motion of such single feed lever.

An object of the invention is to provide a die-sinking machine.

Another object is to provide an attachment for a die-sinking machine whereby a complete spiral can be cut in a workpiece.

Another object is to provide an attachment for a die-sinking machine that moves length feed and breadth feed simultaneously, and so timed that a complete spiral can be cut by a simple operation.

Other objects and many of the attendant advantages of this invention will be readily appreciated as the same becomes better understood by reference to the following detailed description when considered in connection with the accompanying drawings wherein.

Figure 1:
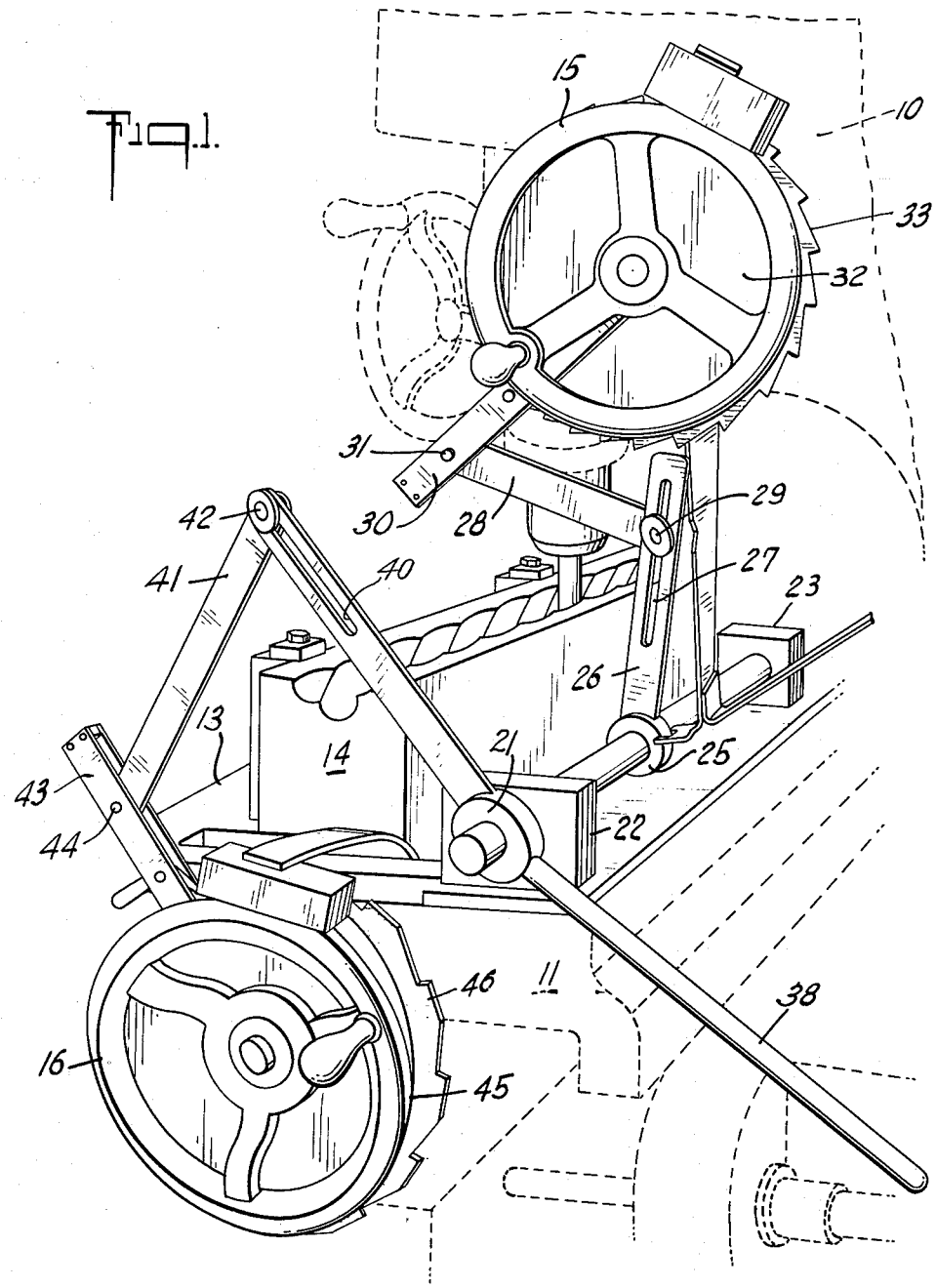
Fig. 1 is a perspective view showing a preferred embodiment of the invention.
Figure 2:
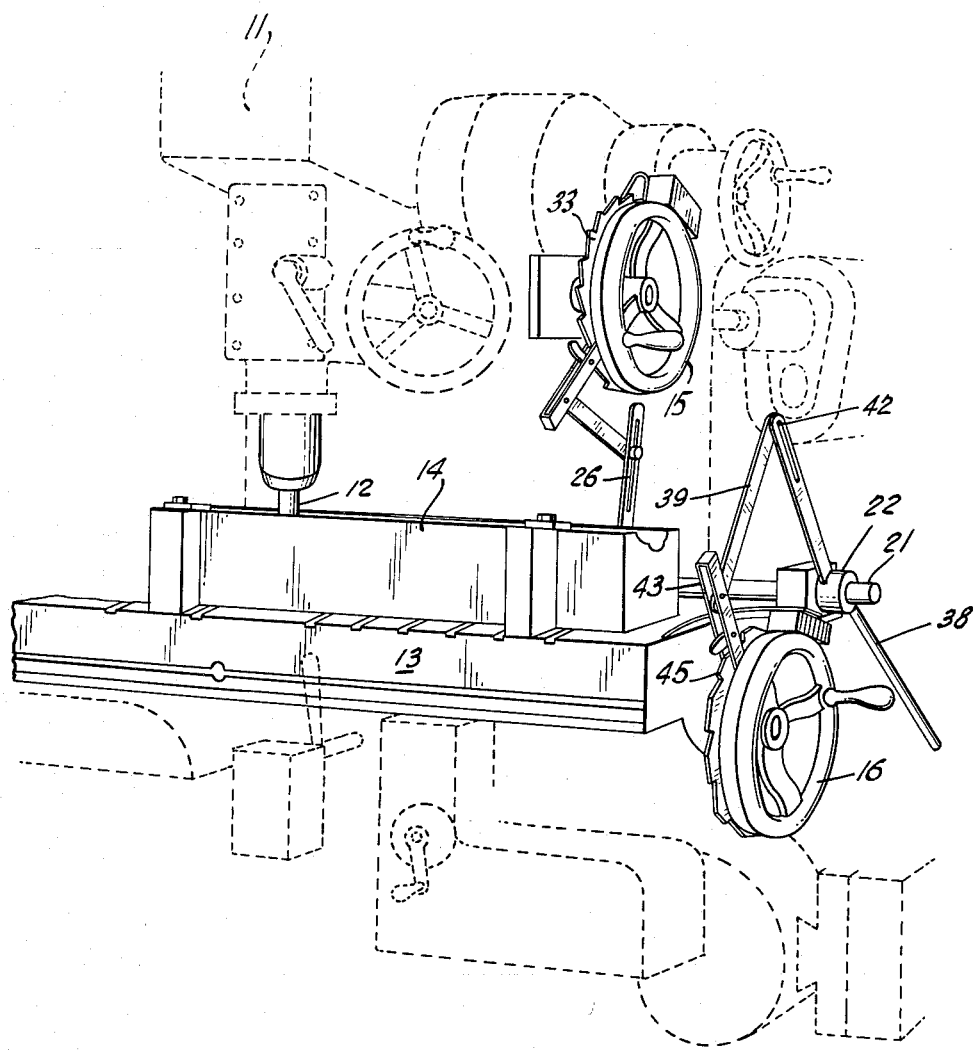
Fig. 2 is a perspective view of the preferred embodiment as seen from the left of Fig. 1.
Figure 3:
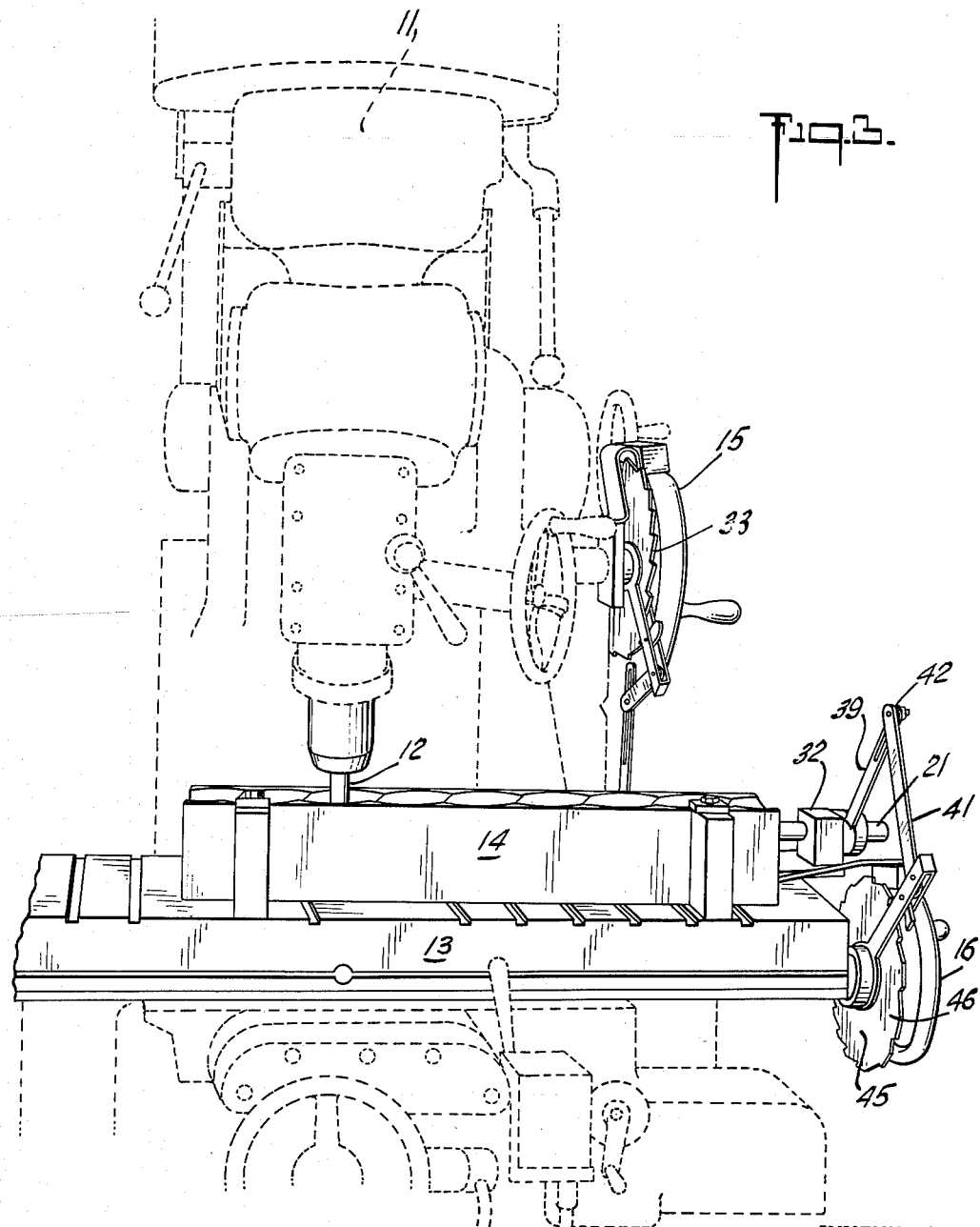
Fig. 3 is a perspective view of the preferred embodiment as seen from the left of Fig. 2.

In the drawings there is shown a die-sinking machine 10 that includes a frame 11 upon which a bedplate 13 is adapted to move along a straight longitudinal path. Bedplate 13 is adapted to support a workpiece 14 wherein a spiral cut is to be made. A cutter 12 is mounted upon frame 11 and is adapted for cutting movement in a circular path normal or breadthwise to the straight longitudinal path of bedplate 13.

There is provided a bedplate hand wheel 16 that upon rotation is adapted to feed bedplate 13 in a longitudinal direction along its path. There is also provided a cutter hand wheel 15 that upon rotation is adapted to move cutter 12 breadthwise along its circular path. The elements thus far described are conventional elements in the conventional type of die-sinking machine such as that manufactured by Pratt and Whitney.

Mounted upon bedplate 11, by means of bearing blocks 22, 23 is a control shaft 21. Mounted on control shaft 21 for rocking movement therewith is a lever 26 that extends adjacent hand-wheel 15 and that is provided near its extremity with an elongated slot 27. A floating lever 28 is fastened at one end by a pin 29 to lever 26. Pin 29 at the end of floating lever 28 is adjustable along slot 27. The other end of floating lever 28 is secured by a pin 31 to a pawl arm 30 that is mounted for rocking movement with respect to hand wheel 15. A ratchet-toothed disk 32 is mounted coaxially with hand wheel 15 and the teeth 33 of disk 32 are adapted for engagement with pawl arm 30.

Mounted on a rocking shaft 21 adjacent bearing block 22 is a collar 37 that is fixedly mounted for rotation with rocking shaft 21. Extending integrally from collar 37 is a handle 38 adapted for actuation by an operator. Extending integrally away from collar 37 in the opposite direction is a lever 39 which at its outer end is provided with an elongated slot 40. A floating link 41 is connected by a pin 42 to lever 39. Pin 42 is adjustable along slot 40. The other end of floating link 41 is fastened by a pin 44 to pawl arm 43. A ratchet-tooth disk 45 is mounted coaxially with hand wheel 16 and the teeth 46 of ratchet-wheel 45 are adapted for cooperation with pawl arm 43.

To assemble the machine for operation, bearing blocks 22 and 23 are mounted upon frame 11, control shaft 21 is mounted in place and levers 26 and 39 are mounted on control shaft 21 and locked in place for rocking movement with shaft 21. Ratchet-tooth disks 32 and 45 are mounted coaxially with hand wheels 15 and 16, respectively, and pawl arms 30 and 43 are mounted to cooperate respectively with teeth 33 and 46. Floating links 28 and 41 are then mounted in place. The operator then rocks handle 38 to determine whether hand wheels 15 and 16 are properly synchronized. In the event hand wheels 15 and 16 are not properly synchronized, adjustments of pins 29 and 42 are made respectively along slots 27 and 40.

A series of ratchet-tooth disks 32 and corresponding ratchet-tooth disks 45 are provided in order to attain the desired proper relation between the circular breadthwise feed of tool 12 and the straight longitudinal feed of bedplate 13.

In operation, the cutting machine is started and adjusted so that cutter 12 is at the beginning of a spiral stroke. The operator then rocks handle 38 back and forth to cause simultaneous rotation of hand wheels 15 and 16 which, because of the linkage provided and the relationship between ratchet-tooth disks 32 and 45, will cause simultaneous rotation of cuttter 12 breadthwise along a circular path and movement of workpiece 14 along a straight longitudinal path whereby a spiral cut is made in workpiece 14.

Obviously many modifications and variations of the present invention are possible in the light of the above teachings. It is therefore to be understood that within the scope of the appended claims the invention may be practiced otherwise than as specifically described.

I claim:

1. In a cutting machine that includes a frame, a bedplate on said frame adapted for longitudinal movement along a straight path, said bedplate being adapted to support a workpiece, a cutter on said frame adapted for cutting movement in a circular path normal to said straight path, a bedplate handwheel on said frame for feeding the bedplate along its path, and a cutter handwheel on said frame for feeding the cutter along its path; a control shaft mounted for rocking movement on said frame, a handle fixed for rocking movement with said shaft, a pair of levers mounted for rocking movement on said shaft, one lever extending adjacent one handwheel and the other lever extending adjacent the other handwheel; a pair of ratchet-toothed discs attached one to each of said handwheels, a pair of rocking pawl arms mounted one for cooperation with each of said ratchet-toothed discs, and a pair of floating links connecting said levers with said arms.

2. The cutting machine defined in claim 1 in which at least one of said levers is provided with an elongated slot whereby the floating link thereto attached can be adjusted along the length of such lever.

3. The cutting machine defined in claim 1 in which both of said levers are provided with elongated slots whereby both the floating links thereto attached can be adjusted along the length of said levers.

4. The cutting machine of claim 1 in which said levers are angularly adjustable about said control shaft so that they can be locked in selected angular position.

5. A cutting machine that includes a frame, a bedplate on said frame adapted for longitudinal movement along a straight path, said bedplate being adapted to support a workpiece, a cutter on said frame adapted for cutting movement in a circular path normal to said straight path, a bedplate feed on said frame for feeding the bedplate along its path, and a cutter feed on said frame for feeding the cutter along its path; a control shaft mounted for rocking movement on said frame, first means connecting said control shaft with said cutter feed, and second means connecting said control shaft with bedplate feed, said first and second means being adapted to cause simultaneous feed of said cutter in a circular path and feed of said bedplate along a straight path normal to the circular path.

6. The cutting machine of claim 5 in which said first means and said second means comprise a mechanical linkage.

7. In a cutting machine that includes a frame, a bedplate on said frame adapted for longitudinal movement along a straight path, said bedplate being adapted to support a workpiece, a cutter on said frame adapted for cutting movement in a circular path normal to said straight path, a bedplate handwheel on said frame for feeding the bedplate along its path, and a cutter handwheel on said frame for feeding the cutter along its path; a control shaft mounted for rocking movement on said frame, a handle fixed for rocking movement with said shaft, a pair of levers mounted for rocking movement on said shaft, one lever extending adjacent one handwheel and the other lever extending adjacent the other handwheel; and the means connecting said levers with said handwheels whereby rocking movement of said control shaft causes simultaneous rotation of said handwheels.

References Cited in the file of this patent

UNITED STATES PATENTS

| 693,344 | Barker | Feb. 11, 1902 |

FOREIGN PATENTS

| 153,552 | Switzerland | June 16, 1932 |
| 183,361 | Great Britain | July 27, 1922 |